Oct. 4, 1949.　　　C. WENTWORTH　　　2,483,794
SAGGER
Filed May 10, 1945
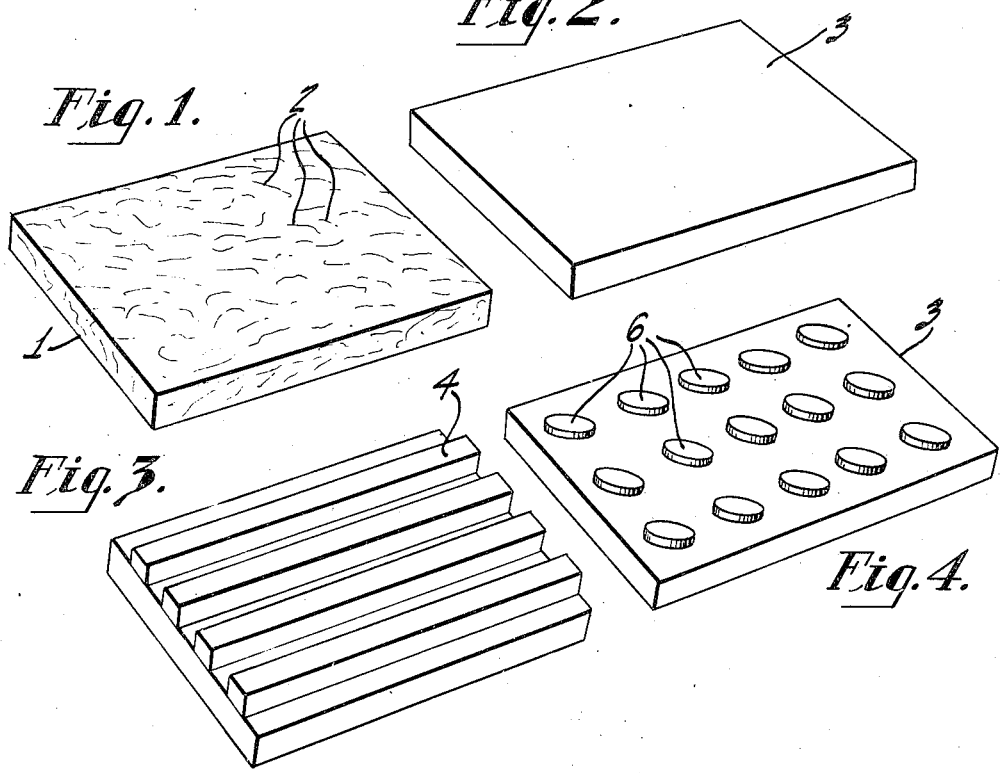
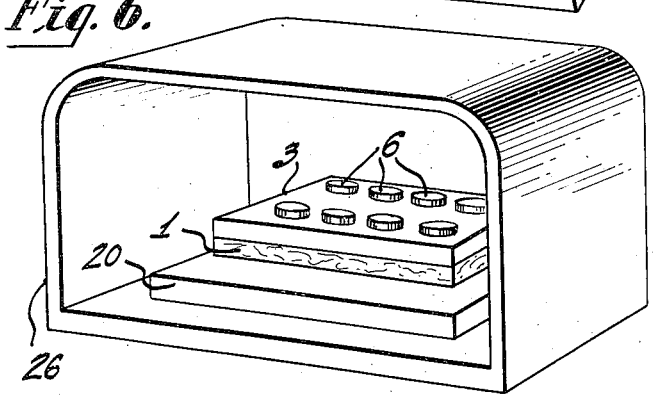
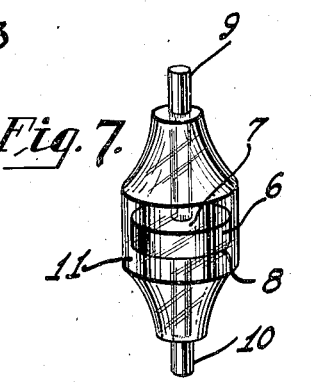
INVENTOR.
CHANDLER WENTWORTH
BY
H. S. Grover
ATTORNEY Patented Oct. 4, 1949

2,483,794

UNITED STATES PATENT OFFICE 2,483,794

SAGGER

Chandler Wentworth, Princeton, N. J., assignor to Radio Corporation of America, a corporation of Delaware Application May 10, 1945, Serial No. 593,071

4 Claims. (Cl. 106—57)

My present invention relates to saggars.

An object of my invention is to provide an improved saggar and also an improved method of making the same. My improved saggar is particularly useful in the manufacture of ceramic, dielectric elements composed in part of one of the titanium compounds. Such elements are used in electric condensers.

It has been proposed to make dielectric elements for condensers of mixtures containing certain titanate compounds such as barium strontium titanate. With one method of manufacture heretofore proposed, preformed condenser elements containing the compound are buried in electrically fused zirconium oxide sand and then heated in a furnace. After removal, the surfaces due to reaction are pitted and cracked, requiring a grinding operation to enable use of the elements in condensers.

Or, the mixture may be pressed into proper shapes (such as in the form of discs) and placed on a saggar made of such material as zirconium silicate compounds. The saggar carrying the condenser elements may then be placed within a muffle and fired in a suitable kiln, such as an electric furnace. During the heating process, I have found that the zirconium silicate saggar, as well as the muffle, react with the elements being heated, causing pitting and cracking of the surfaces.

Here again, in order to make the elements useful for condensers, the surfaces must be ground off. This, of course, involves a waste of material and increased costs, due to the labor involved in the grinding and trimming processes. Furthermore, this difficulty limits the thinness of the condenser elements which can be produced. Moreover, I have found that even after grinding, a certain amount of impurities remain in the condenser element, as a result of which there is impairment, causing departures from desired dielectric constants, power factors and dielectric strengths.

My present invention overcomes the foregoing difficulties and disadvantages. In accordance with my invention, an improved saggar is provided which does not react with the elements which it supports during heating.

Briefly, in accordance with my invention, I first prepare a saggar (which may be termed a rough saggar) which contains approximately 15% to 20% of the compound, such as a titanate used in the condenser dielectric element that is to be fired upon the saggar. This saggar is heated within a muffle upon a zirconium silicate plate. A certain amount of reaction due to the heating follows, resulting in a "working" or rough saggar. The pitted surfaces of the rough saggar are then ground off. A second saggar is then made of a composition similar to that of the rough saggar prior to heating. The second saggar, however, is carried by the rough saggar when the former is heated in the furnace. It will be found that when removed from the furnace, the second saggar, carried by the first, is substantially free of pitting and free of impurities. This saggar is then used to carry the desired condenser elements during the heating process. When this is done, it will be found that substantially no reaction takes place resulting in elements which are free of pitting and which have substantially predetermined and desired dielectric constants, voltage breakdown strengths and power factors.

It should be noted that the remaining 80% of the saggar is made of a highly refractory material such as electrically fused zirconium oxide. In passing, it is to be noted that if it were attempted to make a rough saggar out of the material or mixture forming the dielectric elements, such a saggar would fuse to the dielectric elements which one might seek to fire thereon.

The invention will be more clearly understood by referring to the accompanying drawings in which:

Fig. 1 is a perspective view of a rough saggar.

Fig. 2 is a perspective view of a good or smooth saggar made in accordance with this invention.

Fig. 3 is a perspective view of a modified form of saggar made in accordance with the present invention.

Fig. 4 is a perspective view of condenser elements supported on the saggar of Fig. 2.

Fig. 5 is a perspective view of condenser elements supported on the saggar of Fig. 3.

Fig. 6 is a perspective view of saggar and condenser elements ready to be fired.

Fig. 7 is a perspective view of a condenser using a dielectric element made by use of the improved saggar of this invention.

Referring now in detail to the accompanying drawings and considering a more specific example, suppose it is desired to make a ceramic condenser body or dielectric element of barium strontium titanate. A saggar for such a body is made in accordance with my present invention in the following way. A mixture for the rough saggar 1 as shown in Fig. 1 is first prepared. This mixture consists of, for example, 15% of barium strontium titanate $(BaSr(TiO_3)_2)$ and 85% of electrically fused zirconium oxide $(ZrO_2)$ by weight. This mixture is then used to form 92% of a wet mixture, the remaining 8% of the latter being a 7% methyl cellulose solution. This solution, as is known, consists of 93% water by weight and 7% of methyl cellulose. The methyl cellulose used in the wet mixture completely disappears during the heating within the oven. It serves as a temporary reactionless binder.

The 8% value referred to above is not a fixed one and may vary from 5% to 10%, depending upon the different types of molding used for forming the saggar. In the event that the amount of solution used varies from 5% to 10%, then, of course, the amount of the mixture of barium strontium titanate and electrically fused fused zirconium oxide will vary from 95% to 90% respectively.

The wet mixture is then formed to any desired shape in a press. For example, the shape may be as shown in Fig. 1, simply a rectangular block. This is baked to 100° F. higher than the temperature at which it is expected to use the saggar eventually. This baking temperature may run from 2,300° to 3,000° F. The heating process may require four hours to bring the saggar up to temperature, four hours at the temperature, and then the saggar is allowed to cure or cool with the furnace.

The saggar previously referred to, may, for the firing operation, be carried on a zirconium silicate plate. When removed from the furnace, it will be found to be pitted and rough (as indicated by lines 2 of Fig. 1) due to reaction within the furnace during heating. The majority of the rough spots are ground off so that the first saggar may now be termed the "rough saggar."

A second saggar shown by Fig. 2 is made up of a similar mixture or composition, and is then baked in a similar way. However, this second saggar is supported by the previously prepared "rough saggar" during the baking process. Thus, the second saggar is made of an 8% mixture of a 7% methyl cellulose solution, and 92% by weight of a mixture containing 15% by weight of barium strontium titanate, and 85% by weight of zirconium oxide. The ceramic condenser elements are to be carried by the second saggar. The second saggar is baked as before stated, 100° F. higher than the temperature at which it is expected to be used for firing. After heating up with the oven to the proper temperature in four hours baking at the proper temperature for four hours, and cooling the saggar with the furnace (rapid cooling would cause cracking of the saggar), the second saggar is removed. It will be found, as shown in Fig. 2, that the second saggar is free of pitting. This saggar may have a flat top as shown in Fig. 2, or it may be shaped with a plurality of ridges 4 as shown in Fig. 3, so that its upper surface carries a plurality of longitudinal strips parallelly arranged.

The saggars of Figs. 2 and 3 may now be used for the firing of the condenser element. In this case, the saggars of Figs. 2 and 3 containing the compositions indicated, and made as described, will be very useful for firing dielectric condenser elements 6 made of barium strontium titanate. As shown in Fig. 4, the latter may be shaped in the form of discs and carried by the saggar 3 of Fig. 2; or, if desired, the condenser elements 6 may be formed of barium strontium titanate and carried on a saggar of the form shown in Fig. 3 (as indicated in Fig. 5) prior to firing. If desired, as shown in Fig. 6, the furnace may be loaded for firing by mounting the previously prepared saggar of Fig. 2 upon the rough saggar of Fig. 1. These two saggars in turn may be carried by a zirconium silicate saggar 20, and all saggars together with condenser elements 6 of barium strontium titanate may then be placed in a muffle 26 before firing in an electric furnace (not shown). The assembly of Fig. 6 is placed in the furnace and heated no higher than 100° F. less than the temperature to which saggar 3 was subjected.

The discs 6 referred to hereinabove may be made very thin, if fired upon improved saggars made in accordance with my present invention. Thin discs are especially desirable in electrical condensers. If it is attempted to fire thin discs of barium strontium titanate according to methods heretofore employed, it will be found to be impossible to do so because of reactions customarily encountered which will cause pitting and perforation of the thin discs of barium strontium titanate. I have been successful in firing thin discs of this material by use of my improved saggars, which I have found to be substantially inert and free of reaction with the condenser elements. More specifically, I have successfully made condenser discs containing barium strontium titanate and have baked them to a temperature of 2,400° F., without pitting or deterioration, upon saggars made in accordance with Fig. 2 herein. I have made condenser discs as thin as 100th of an inch and having diameters varying from ¼ to 3 inches.

Discs, containing barium strontium titanate or similar material, made in accordance with my present invention may be used in condensers of a form such as shown in Fig. 7.

Thus, after baking the barium strontium titanate buttons 6, they are provided with silver electrodes 7 and 8. The silver may be placed on opposite sides of each button by first placing the button in a plastic stencil (not shown) and burnished silver paste applied. The paste is squeezed through a silk screen (not shown) on the electrode surfaces. The condenser elements 6 with the silvered surfaces are then rebaked to about 1,380° F., then allowed to cool. Copper electrode terminals 9 and 10 are then soldered to the silver electrode surfaces in the following way.

The copper electrode terminals are tinned with a solder containing 48% lead, 48% tin, and 4% silver. An excess of solder is left on the electrode terminals. The hot button is taken from the drying oven and placed between the two copper electrode terminals in a jig. The copper electrodes are heated with a small flame until the solder melts and wets the silver on the button. As soon as the solder has solidified, the condenser unit is dipped in a polyvinyl acetal enamel and placed in an oven at 250° F. for fifteen minutes, when another coat of a polyvinyl acetal is applied to keep out moisture. After fifteen minutes at 250° F., the unit is placed in a mold and a casing of polystyrene (or a methyl methacrylate casing 11) is molded on and allowed to cool to room temperature. The capacity of the condenser so made will stabilize within twenty-four hours.

The terminals 9 and 10 protrude beyond the casing for connection purposes. In all operations, cleanliness is important. Small percentages of impurities will raise the power factor as much as ten times. Contact with the surface of the fired buttons should be avoided until the silver has been applied. The buttons should not be allowed to reach room temperature until they have been coated and molded. If they do reach room temperature before they are coated with enamel, they should be baked at 320° F. for one hour before they are coated. The capacity of a unit made up by the above process had an electric capacity of approximately 750 micro-microfarads.

In general, referring again to Figs. 2 and 3, the saggar of my invention should contain approximately 15% to 20% of the titanate that is to be fired on the ceramic. For example, suppose the ceramic body to be fired is a lead titanate. Then the saggar should contain 15% to 20% by weight of lead titanate and the remainder should be electrically fused zirconium oxide. Ordinary zirconium oxide may be employed, but I prefer to use the electrically fused type in view of its superior thermal properties.

Other titanates may be employed, such as magnesium titanate and calcium titanate, in the mixtures for the dielectric elements and saggars.

The invention, moreover, is not limited to saggars employed for the manufacture of dielectrics, but may also be used in the manufacture of many other devices.

Having thus described my invention, what I claim is:

1. A saggar made of a mixture containing 15% to 20% by weight of a titanate from the class consisting of barium, strontium, calcium, magnesium, and lead titanates, and 85% to 80% by weight of zirconium oxide.

2. A saggar made of a mixture containing 15% to 20% by weight of a titanate from the class consisting of barium, strontium, calcium, magnesium, and lead titanates, and 85% to 80% by weight of fused zirconium oxide.

3. A saggar containing 15% of barium strontium titanate and 85% by weight of zirconium oxide.

4. A saggar made from a wet mixture of 15% by weight of a titanate from the class consisting of barium, strontium, calcium, magnesium, and lead titanates, and 85% by weight of zirconium oxide.

CHANDLER WENTWORTH.

REFERENCES CITED

The following references are of record in the file of this patent:

UNITED STATES PATENTS

| Number | Name | Date |
|---|---|---|
| 1,448,011 | Tone | Mar. 13, 1923 |
| 2,143,003 | Gould | Jan. 10, 1939 |
| 2,220,411 | Kinzie | Nov. 5, 1940 |
| 2,402,517 | Wainer | June 18, 1946 |

OTHER REFERENCES

Searle Refractory Materials (1924), page 447.